United States Patent
Tarandek et al.

(10) Patent No.: US 11,919,489 B2
(45) Date of Patent: Mar. 5, 2024

(54) MASTER CYLINDER ARRANGEMENT FOR A BRAKE SYSTEM

(71) Applicant: HL MANDO CORPORATION, Pyeongtaek-si (KR)

(72) Inventors: Kristijan Tarandek, Neu-Isenburg (DE); Hans-Jörg Feigel, Rosbach (DE); I-Che Chiang, Frankfurt am Main (DE); Priti Kumari, Frankfurt am Main (DE)

(73) Assignee: HL MANDO CORPORATION, Pyeongtaek (KR)

( * ) Notice: Subject to any disclaimer, the term of this patent is extended or adjusted under 35 U.S.C. 154(b) by 443 days.

(21) Appl. No.: 17/413,616

(22) PCT Filed: Dec. 16, 2019

(86) PCT No.: PCT/KR2019/017834
§ 371 (c)(1),
(2) Date: Jun. 14, 2021

(87) PCT Pub. No.: WO2020/122691
PCT Pub. Date: Jun. 18, 2020

(65) Prior Publication Data
US 2022/0041149 A1 Feb. 10, 2022

(30) Foreign Application Priority Data
Dec. 14, 2018 (DE) .................... 10 2018 221 779.3

(51) Int. Cl.
*B60T 11/20* (2006.01)
*B60T 7/04* (2006.01)
(Continued)

(52) U.S. Cl.
CPC ............... *B60T 11/20* (2013.01); *B60T 7/042* (2013.01); *B60T 8/409* (2013.01); *B60T 13/14* (2013.01);
(Continued)

(58) Field of Classification Search
CPC ........ B60T 8/4086; B60T 8/409; B60T 11/20; B60T 11/224; B60T 13/14; B60T 13/142;
(Continued)

(56) References Cited

U.S. PATENT DOCUMENTS 3,350,883 A * 11/1967 Rohlfs .................... B60T 11/20
188/152
3,355,887 A * 12/1967 Balster .................... B60T 11/20
188/152
(Continued)

FOREIGN PATENT DOCUMENTS

| JP | 2006-256408 A | 9/2006 |
|---|---|---|
| KR | 10-2017004519 A | 4/2017 |

OTHER PUBLICATIONS

International Search Report issued in corresponding International Patent Application No. PCT/KR2019/017834 dated Dec. 16, 2019.

*Primary Examiner* — Thomas J Williams
(74) *Attorney, Agent, or Firm* — Harvest IP Law, LLP

(57) ABSTRACT

The present invention relates to a master cylinder arrangement for a brake system, comprising a tandem master cylinder including a master cylinder housing, a first master piston movably arranged in the master cylinder housing, a second master piston movably arranged in the master cylinder housing, a balancing piston movably arranged in the second master piston, and an elastic pedal feel element. The invention further relates to a hydraulic system for a brake system as well as a brake system.

14 Claims, 2 Drawing Sheets

(51) Int. Cl.
    *B60T 8/40*     (2006.01)
    *B60T 13/14*     (2006.01)
    *B60T 13/68*     (2006.01)
    *B60T 13/74*     (2006.01)
    *B60T 17/22*     (2006.01)
    *F15B 13/14*     (2006.01)

(52) U.S. Cl.
    CPC .......... *B60T 13/686* (2013.01); *B60T 13/745* (2013.01); *B60T 17/22* (2013.01); *B60T 2220/04* (2013.01); *B60T 2270/406* (2013.01); *F15B 13/14* (2013.01)

(58) Field of Classification Search
    CPC ...... B60T 13/686; B60T 13/745; B60T 17/22; B60T 7/042; F15B 13/14
    USPC .................................. 188/152; 60/562, 563
    See application file for complete search history.

(56) References Cited

U.S. PATENT DOCUMENTS

| | | | | |
|---|---|---|---|---|
| 3,955,371 | A | * | 5/1976 | Bueler .................. B60T 11/224 92/60 |
| 5,887,432 | A | * | 3/1999 | Clauss .................... B60T 7/042 60/591 |
| 6,014,862 | A | | 1/2000 | Shaw et al. |
| 6,135,575 | A | * | 10/2000 | Feigel .................. B60T 8/4863 303/114.1 |
| 6,267,456 | B1 | | 7/2001 | Crombez |
| 2003/0214179 | A1 | | 11/2003 | Kusano |

\* cited by examiner

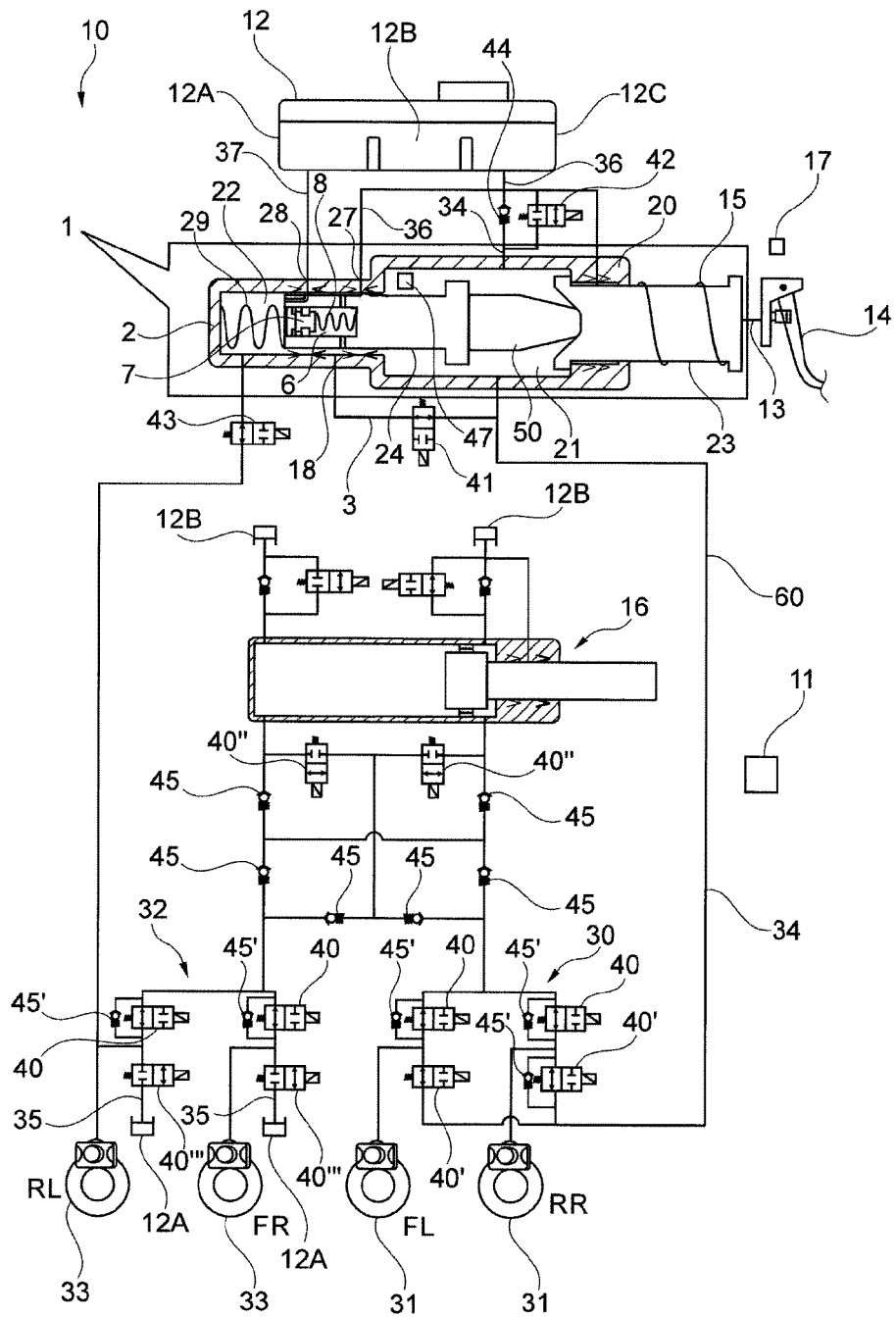
[Fig. 1]

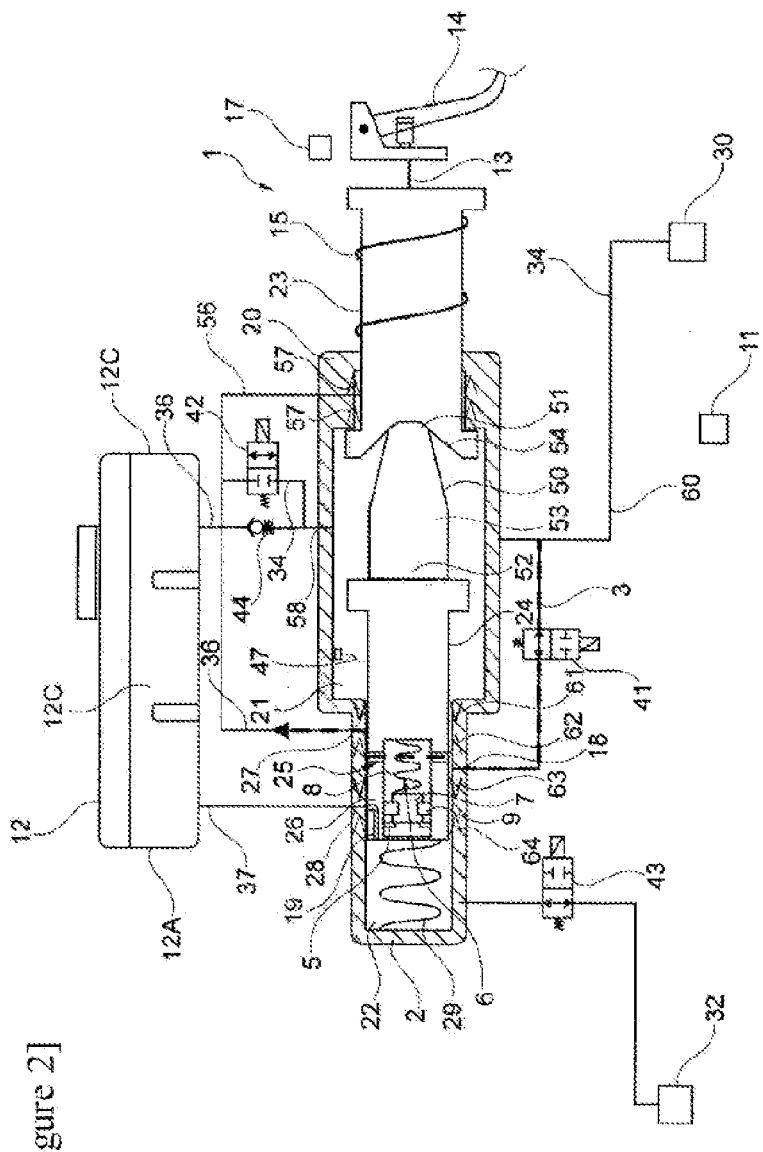
[Figure 2]

MASTER CYLINDER ARRANGEMENT FOR A BRAKE SYSTEM

CROSS-REFERENCE OF RELATED APPLICATIONS

This application is the U.S. National Phase under 35 U.S.C. § 371 of International Patent Application No. PCT/KR2019/017834, filed on Dec. 16, 2019, which claims the benefit of German Patent Application No. 10 2018 221 779.3, filed on Dec. 14, 2018, the entire disclosures of each are incorporated by reference herein.

TECHNICAL FIELD

The present invention relates to a master cylinder arrangement for a brake system, a hydraulic system for a brake system as well as a brake system. The master cylinder arrangement, the hydraulic system and the brake system can be used in a normal operating mode, an emergency mode and/or a test mode.

BACKGROUND ART

A conventional powered braking system is shown for example in FIG. 1 of US 2014/01594773 A1. In such a conventional brake system, a pedal travel sensor is coupled to a brake pedal and operable to detect an amount of travel of the brake pedal, so that a corresponding signal can be sent to a controller. The controller interprets the signal and sends a further signal to a hydraulic pressure supplier including an actuator. In turn, the actuator pressurizes braking fluid to operate hydraulic wheel brakes. Furthermore, a separate pedal feel simulator is provided to mimic the feel and travel present during braking of a conventional braking system that supplies fluid directly from a master cylinder to wheel cylinders.

DISCLOSURE

Technical Problem

The object of the present invention is to provide an alternative master cylinder and a pedal feel simulator.

Technical Solution

According to claim 1, a master cylinder arrangement for a brake system is provided.

The master cylinder arrangement comprises a tandem master cylinder including a master cylinder housing, a first master piston movably arranged in the master cylinder housing, a second master piston movably arranged in the master cylinder housing, a balancing piston movably arranged in the second master piston, and an elastic pedal feel element.

The master cylinder housing encloses a first master chamber and a second master chamber. The first master piston is directly displaceable by operating a brake pedal. The second master piston is a floating piston and separates the first master chamber, which is between the first master piston and the second master piston, from the second master chamber.

The elastic pedal feel element is arranged in the first master chamber to be in contact with the first master piston and the second master piston for generating a pedal force when the brake pedal is operated while the second master piston is locked in a normal operating mode.

Moreover, the second master piston encloses a balancing chamber, the balancing piston separating the balancing chamber from the second master chamber and the balancing chamber being hydraulically connected to the first master chamber via a balancing path for balancing a first hydraulic pressure in the first master chamber and a second hydraulic pressure in the second master chamber when the second master piston is unlocked in an emergency operating mode.

A first ventilation channel is provided in a piston wall of the second master piston, the first ventilation channel hydraulically connecting the balancing chamber to a first inlet for brake fluid supply in a rest position of the second master piston so that the first master chamber is hydraulically connected to the first inlet via the balancing path and the first ventilation channel, wherein a first cut-off valve is arranged in the balancing path for blocking the balancing path in a test mode of the master cylinder arrangement.

When the master cylinder arrangement is operated in the normal operating mode during a brake action, the first master piston is advanced towards the second master piston thereby resulting in a deformation of the elastic pedal feel element. In the proposed the master cylinder arrangement, the elastic pedal feel element can mimic the pedal force of a brake pedal of a conventional braking system during a braking action. Thus, the elastic pedal feel element can function as a pedal simulator and the driver experiences a counterforce when the brake pedal is operated. As the elastic pedal feel element is integrated in the master cylinder, no separate pedal simulator or additional switching or locking valves are required.

The emergency mode may be used as a back-up mode/hydraulic fall-back mode, for instance when there is a power failure or when one or more electrically actuated valves do not function properly. In the emergency mode braking fluid can be supplied directly from the tandem master cylinder arrangement to hydraulic wheel brakes. Thus, the master cylinder arrangement may be connected to hydraulic wheel brakes of a brake system and may allow operating the hydraulic wheel brakes in case of an emergency.

When the master cylinder arrangement is operated during a braking action in the emergency mode, pressure differences between the first and second master chambers may arise, for instance by virtue of the elastic pedal feel element disposed in the first master chamber and between the first and second master pistons. The balancing piston facilitates pressure equalization between the first master chamber and the second master chamber in the emergency mode. In this way, equalized pressures can be provided to operate the hydraulic wheel brakes of the brake system. It should be mentioned that the pressure equalization by means of the movable balancing piston is accomplished without using a direct hydraulic connection between the first and second master chambers, i.e. without brake fluid exchange between the first and second master chambers.

The first cut-off valve thereby allows the first master chamber to be pressurized in the test mode for testing tightness of the first master chamber and, in particular, of seals of the first master chamber. Furthermore, no extra inlet and no channel in the first master piston is needed for ventilating the first master chamber, a further consequence being that the number of cut-off valves required for testing the tightness of the first master chamber and its seals is reduced to a minimum. Notable, the first ventilation channel may also allow ventilating/filling the balancing chamber with brake fluid.

A second ventilation channel may provided in the piston wall of the second master piston, the second ventilation channel hydraulically connecting the second master chamber to a second inlet for brake fluid supply in the rest position of the second master piston. By virtue of this configuration, the second master chamber may be filled with hydraulic fluid, e.g. after a braking action in the emergency mode.

A plurality of seals may be envisaged to seal parts of the master cylinder arrangement. For instance, a first seal, a second seal, a third seal and/or a fourth seal can be arranged between the piston wall of the second piston and a wall of the master cylinder housing. The first, second, third and/or fourth seals may be annularly shaped and may surround the second master piston. Said seals may be configured to fit in corresponding recesses or grooves formed in the piston wall of the second piston or the wall of the master cylinder housing.

For instance, the first inlet may be arranged between the first seal and the second seal. Further, the second inlet may be arranged between the third seal and the fourth seal. Optionally, the balancing path passes through a hole in the wall of the master cylinder housing which is arranged between the second seal and the third seal.

The first seal may provide a fluid tight seal between the first master chamber and the first inlet, and may prevent fluid from directly flowing from the first master chamber to the first inlet. The second seal may provide a fluid tight seal between the first inlet and a reservoir (see below) when the second master piston is moved out of its rest position. The third seal may provide a fluid tight seal between the hole and the second inlet, and may prevent fluid from flowing from the hole to the second master chamber. The fourth seal may provide a fluid tight seal between the second master chamber and the second inlet, and may prevent fluid from flowing from the second master chamber to a reservoir (see below) when the second master piston is moved out of its rest position.

In exemplary embodiments, the balancing path comprises a part of the first ventilation channel or an extra balancing channel provided in the piston wall of the second master piston. The balancing channel may be axially offset from the first ventilation channel. In further embodiments, the first ventilation channel and/or the balancing channel may be arranged to span a sealing lip of the second seal in the rest position of the second master piston.

It may be envisaged that the first cut-off valve is a normally open valve. The first cut-off valve can be closed in the test mode, while the first cut-off valve can be opened in the emergency mode. In the normal operating mode, the first cut-off valve can be opened or closed.

In some examples, a spring is arranged in the balancing chamber biasing the balancing piston towards a rest position in which the balancing chamber assumes a maximum volume. The spring may facilitate urging the balancing piston back to its rest position when changing from the emergency mode to the normal operating mode and/or when changing from a brake position towards a non-braking position (also called rest position) in the emergency mode.

The balancing chamber may be formed by a recess in the second master piston. In some instances, the recess may be cast together with the second master piston or machined in the second master piston.

In exemplary embodiments, a spring is arranged in the second master chamber biasing the second master piston towards the first master piston and towards its rest position. The spring may facilitate urging the second master piston back to its locking position when changing from the emergency mode to the normal operating mode and/or when changing from a brake position towards a non-braking position in the emergency mode. The non-braking position (also called rest position) of the second master piston in the emergency mode may correspond to the locking position of the second master piston in the normal operating mode.

In the normal operating mode, the balancing piston is typically in its rest position. The second master piston may be in its locking position in the normal operating mode. In the emergency mode, the second master piston can be unlocked and moved out of its locking position. During a brake action, pressurized brake fluid in the first master chamber and the elastic pedal feel element urge the second master piston out of its locking position. Due to the elastic pedal feel element the pressure in the second master chamber may be higher than the pressure in the first master chamber. When the pressure inside the second master chamber is higher than the pressure inside the first master chamber, the balancing piston may be moved out of its rest position thereby increasing decreasing the volume of the balancing chamber. As the balancing chamber is hydraulically connected to the first master chamber, the pressure inside the second master chamber and the pressure inside the first master chamber can be equalized. After the brake action, the balancing piston is moved back to its rest position.

As the second master piston can be locked in the normal operating mode and/or the test mode, a volume of the second master chamber can be substantially constant in said modes. Thus, pressure equalization between the first master chamber and the second master chamber may not be not required in the normal operating mode or in the test mode. Therefore, the balancing piston is typically redundant in the normal operating mode and/or the test mode.

The elastic pedal feel element may be made of an elastomer. The elastic pedal feel element may comprise a body, which may be a solid body. Furthermore, the body of the elastic pedal feel element may be an elongated body having a first axial end portion, an opposing second axial end portion and an intermediate portion therebetween. Furthermore, a longitudinal direction of the elongate body may be axially aligned with the master cylinder. Optionally, a centreline of the elongate body may coincide with a centreline of the master cylinder. The first axial end portion of the body may be in contact with the first master piston, while the second axial end portion of the body may be in contact with the second master piston. The elastic pedal feel element may comprise a progressive spring characteristic.

In this way, the pedal travel and feel experienced by the driver may be improved. The body may include a tapered portion. For instance, the first or second end portion may be tapered. The intermediate portion may be cylindrical in shape and may have a constant diameter. A diameter of the cylindrical portion may be generally greater than the tapered portion. The first master piston and/or the second master piston may include a recess that receives at least a part of the elastic pedal feel element. The corresponding recess may be formed such to allow the elastic pedal feel element to be compressed in the axial direction, i.e. expanded in a radial direction inside the recess. When the brake pedal is completely depressed, the elastic pedal feel element may be deformed such to snugly fit in the recess. The elastic pedal feel element can be designed for a compressive loading.

Furthermore, a hydraulic system for a brake system is provided. The hydraulic system comprises the master cylinder arrangement as described above. Furthermore, the hydraulic system includes a reservoir for storing the brake fluid, wherein the inlet (first and/or second inlet) or each of the inlets for brake fluid supply is hydraulically connected to the reservoir and wherein the first master chamber is furthermore hydraulically connected to the reservoir via a pressure release path.

A second cut-off valve may be arranged in the pressure release path, e.g. between the reservoir and the first master chamber, for blocking the pressure release path in the emergency operating mode and in the test mode. The second cut-off valve may be a normally closed valve. Typically, the second cut-off valve can be opened in the normal operating mode, while the second cut-off valve can be closed in the emergency mode and/or the test mode.

Further, the first and/or second cut-off valves can be electrically operable, e.g. by corresponding control signals from a control unit (see below). Optionally, the first and/or second cut-off valves may be solenoid valves.

Moreover, a brake system is proposed. The brake system comprises the hydraulic system as described above. Further, the brake system may include a brake pedal for displacing the first piston; a first hydraulic circuit including at least one first hydraulic wheel brake; a second hydraulic circuit including at least one second hydraulic wheel brake; and a hydraulic pressure supplier including an actuator for pressurizing the first hydraulic circuit and the second hydraulic circuit depending on an operation of the brake pedal in the normal operating mode.

The first master chamber is hydraulically connected to the first hydraulic circuit for pressurizing the first hydraulic circuit in the emergency operating mode. The second master chamber may be hydraulically connected to the second hydraulic circuit via a third cut-off valve for pressurizing the second hydraulic circuit in the emergency operating mode when the third cut-off valve is open, while the second master piston can be locked by closing the third cut-off valve in the normal operating mode.

The brake system may further comprise a brake pedal sensor for detecting an operation of the brake pedal. Such a brake pedal sensor may be, for example, a pressure sensor or a distance sensor. The brake pedal sensor may be configured for detecting an amount of travel of the brake pedal during a braking action.

Furthermore, the brake system may comprise a control unit. The control unit may be configured to perform a number of different actions. For instance, the control unit may be envisaged for activating the hydraulic pressure supplier and/or controlling valves of the brake system. The control unit may activate the hydraulic pressure supplier and/or control the valves depending on sensor signals of the brake pedal sensor. The control unit may be configured to control valves comprised by the first and the second hydraulic circuit, the first cut-off valve, the second cut-off valve and/or the third cut-off valve. The control of the valves may depend on the operating mode of the brake system, e.g. the normal operating mode, the emergency mode or the test mode.

In some instances, the control unit is configured for keeping the second cut-off valve open and the third cut-off valve closed in the normal operating mode and/or for closing the second cut-off valve and opening the third cut-off valve in order to switch the brake system in the emergency operating mode when a failure is detected.

In further embodiments, the control unit is configured for performing a self-test of the brake system by closing the first cut-off valve and the second cut-off valve and by controlling the actuator to pressurize the first master chamber.

During the self-test the fluid tightness of the first master chamber and/or at least one of the seals mentioned above may be tested. At least one pressure sensor may be envisaged for directly or at least indirectly measuring the pressure of the brake fluid inside the first master chamber during the self-test. The at least one pressure sensor may send the measurement results to the control unit.

It should be mentioned that locking the second master chamber is not restricted by the examples described herein. For instance, an alternative locking mechanism may be envisaged for locking the second master chamber in the normal operating mode. An example for such an alternative locking mechanism may be a locking chamber that is described and shown in FIG. 2 of co-pending German patent application DE 10 2018 221 757.2 filed on Dec. 14, 2018, the disclosure of which is hereby incorporated by reference for all purposes.

In the present disclosure, ventilation may refer to filling/supplying a chamber with brake fluid, especially in a rest position.

Advantageous Effects

The master cylinder arrangement for a brake system according to the various embodiments of the present disclosure may be effectively used in a normal operating mode, an emergency mode and/or a test mode.

DESCRIPTION OF DRAWINGS

Various objects and advantages of the present invention will become apparent to those skilled in the art from the following detailed description of embodiments, when read in light of the accompanying drawings.

There are shown in

FIG. 1 a schematic diagram of a brake system; and

FIG. 2 a master cylinder arrangement that is part of the brake system of FIG. 1.

BEST MODE

In the following, recurring and similar features in this and in the subsequent representations are provided with the same reference numerals.

FIG. 1 shows a schematic diagram of a brake system 10. FIG. 2 shows a schematic diagram of a master cylinder arrangement 1 that is part of the brake system 10 of FIG. 1. In the following, reference is made to both FIGS. 1 and 2.

The illustrated brake system 10 is provided with dual hydraulic circuits 30, 32 each including two hydraulic wheel brakes 31, 33. The number of hydraulic wheel brakes 31, 33 per hydraulic circuit may vary. For instance a higher number (e.g. three or more) or smaller number (e.g. one) of wheel brakes 31, 33 per hydraulic circuit are also contemplated by the present invention. The brake system 10 comprises a brake pedal 14, a return spring 15 biasing the brake pedal 14 in the return direction towards a rest position and an input rod 13 connected to the brake pedal 14. In the brake system 10 of FIG. 1, at least one brake pedal sensor 17 is operable to detect a parameter that corresponds to an amount of travel of the brake pedal 14, so that a corresponding signal can be sent to a controller 11. The controller 11 may send a signal to a hydraulic pressure supplier 16 which comprises an actuator for pressurizing brake fluid to operate the hydraulic wheel brakes 31, 33 depending on an operation of the brake pedal in a normal operating mode of the brake system 10. The brake fluid is stored in reservoir 12 and includes three fluid compartments 12A, 12B, 12C being separated by walls. The fluid compartments 12A, 12B, 12C are in fluid communication when the brake fluid level in the reservoir 12 is higher than the walls separating the fluid compartments 12A, 12B, 12C. The advantage of providing a plurality of fluid compartments 12A, 12B, 12C is that the brake fluid contained in the reservoir 12 will not completely drain in case of a fluid leak in a subsystem of the brake system 10.

The first and second hydraulic circuits 30, 32 comprise a plurality of cut-off valves 40, 40', 40''' that can be selectively controlled by the controller 11. The cut-off valves 40, 40', 40''' may be 2/2 way solenoid valves. The cut-off valves 40 are positioned between the pressure supplier 16 and each of the hydraulic wheel brakes 31, 33 such that movement of hydraulic fluid from the pressure supplier 16 and to the hydraulic wheel brakes 31, 33 can be selectively enabled and selectively blocked via operation of the cut-off valves 40. Furthermore, the cut-off valves 40', 40''' are positioned between the hydraulic wheel brakes 31, 33 and the reservoir 12 such that movement of hydraulic fluid from the hydraulic wheel brakes 31, 33 and to the reservoir 12 can be selectively enabled and selectively blocked via operation of the cut-off valves 40', 40'''. The first and second hydraulic circuits 30, 32 may also comprise a plurality of check valves 45'. Furthermore, a plurality of cut-off valves 40'' that may be designed as 2/2 way solenoid valves and a plurality of check valves 45 are located between the pressure supplier 16 and the first and second hydraulic circuits 30, 32. To improve control and enable self-testing of the brake system 10, several parameters may be monitored by a plurality of sensors (not shown), such as pressure, angular and distance sensors. The output of the sensors is directed to the controller 11.

The operation of the first and second hydraulic circuits 30, 32 in combination with the hydraulic pressure supplier 16 may be apparent for the skilled person from FIG. 1 and not outlined in detail for the sake of brevity.

Thus, in the normal (powered) operation mode of the brake system 10, depression of the brake pedal 14 does not directly apply braking force to the hydraulic wheel brakes 31, 33 through the brake fluid, but rather, the brake fluid is provided to the hydraulic wheel brakes 31, 33 by the hydraulic pressure supplier 16 and control of the solenoid valves 40, 40', 40''' in the first and second hydraulic circuits 30, 32.

The brake system 10 further comprises a master cylinder arrangement 1 that performs two functions, namely operation of the hydraulic wheel brakes 31, 33 in an emergency mode and simulation of the brake pedal 14 in the normal operating mode. These functions will become apparent from the following description.

As can be seen from FIG. 2, the master cylinder arrangement comprises a tandem master cylinder 2 with a master cylinder housing 20. The tandem master cylinder includes a first master chamber 21, a second master chamber 22, a first master piston 23, and a second master piston 24. The first master piston 23 is configured to be moveable under the brake operating force transmitted from the brake pedal 14 through the input rod 13. Thus, the first master piston 23 is directly displaceable by operating the brake pedal 14. The first master chamber 21 is hydraulically connected to the first hydraulic circuit 30 for pressurizing the hydraulic circuit 30 in an emergency mode of the brake system 10 (see below).

The second master piston 24 is a floating piston that separates the first master chamber 21, which is between the first master piston 23 and the second master piston 24, from the second master chamber 22. The second master chamber 22 is hydraulically connected to the second hydraulic circuit via a third cut-off valve 43 for pressurizing the second hydraulic circuit 32 in an emergency mode, when the third cut-off valve 43 is open. The second master piston 24 can be locked in a locking position by closing the third cut-off valve 43 in the normal operating mode. A coil spring 29 is arranged in the second master chamber 22 biasing the second master piston 24 towards the first master piston 23 and towards the locking position. Optionally, the first master chamber 21 is hydraulically connected to the reservoir 12 (reservoir compartment 12C) via a second cut-off valve 42. The third cut-off valve 43 may be a normally open valve (NO valve) whereas the second cut-off 42 valve may be a normally closed valve (NC valve). The second and third cut-off valves 42, 43 may be solenoid valves that can be electrically actuated and controlled by the controller 11. Moreover, the second and third cut-off valves 42, 43 may be 2/2 way valves having two connections and two valve positions.

Furthermore, an elastic pedal feel element 50 is arranged in the first master chamber 21 for generating a pedal force when the brake pedal 14 is operated in the normal operating mode. The elastic pedal feel element is disposed between the first master piston 23 and the second master piston 24. Preferably, the elastic pedal feel element 50 may be integrally formed of an elastomer, such as rubber or silicone. In particular, the elastic pedal feel element 50 is designed for a compression force and has a progressive spring characteristic.

The elastic pedal feel element 50 may comprise an elongate, solid body. A longitudinal direction of the elongate body may be axially aligned with the master cylinder 20. In the embodiment shown, a centreline of the elongate body coincides with a centreline of the master cylinder 20. Furthermore, the body includes a first axial end portion 51, an opposing second axial end portion 52 and an intermediate portion 53 therebetween. The first axial end portion 51 of the body is in contact with the first master piston 23, while the second axial end portion 52 of the body is in contact with the second master piston 24.

The first end portion 51 may be tapered and optionally has a conical shape. The intermediate portion 53 may be cylindrical in shape and may have a substantially constant diameter. The second end portion 52 has a diameter that equals the diameter of the intermediate portion 53. The first master piston 23 may include a recess 54 that receives the first axial end portion 51. The recess 54 may be formed such to allow the elastic pedal feel element 50 to be compressed in the axial direction and expanded in a radial direction inside the recess 54. When the brake pedal 14 is completely depressed, the elastic pedal feel element 50 is deformed such to snugly fit in the recess 54 of the first master piston 23. In both the normal operating mode and the emergency mode, the elastic pedal feel element 50 is retained between the first and second master pistons 23, 24. Alternatively, the second end portion 52 may be tapered and received in a recess formed in the second master piston 24.

In the following description, the normal operating mode and the emergency mode are described.

In the normal operating mode (powered operating mode), the third cut-off valve 43 is in its closed position, whereas the second cut-off valve 42 is in its open position. For instance, the controller 11 may be configured for keeping the second cut-off valve 42 open and the third cut-off valve 43 closed in the normal operating mode. As a result, the second master piston 24 is locked in its locking position in the normal operating mode. When a user or driver depresses the brake pedal 14, the input rod 13 pushes the first master piston 24 further into the master cylinder 20. As the second master piston 24 is locked, the elastic pedal element 50 is compressed between the first master piston 23 and the second master piston 24. As a result, the driver experiences a brake pedal feel that he/she would also experience when operating a conventional brake system being solely hydraulically actuated during a brake action. In addition, the brake fluid inside the first chamber 21 is directed via an opening 58 in the master cylinder housing 20 and via the opened cut-off valve 42 to the reservoir 12.

The controller 11 sends a signal to a hydraulic pressure supplier 16 depending on the position of the brake pedal 14. Furthermore, the controller 11 controls and operates the cut-off valves 40, 40', 40''' of the first and second hydraulic circuits 30, 32 such that the first and second hydraulic circuits 30, 32 are pressurized and the hydraulic wheel brakes 31, 33 can be applied. More specifically, the valves 40 are opened while the valves 40', 40''' are closed so that the hydraulic wheel brakes 31, 33 can be operated. When the user or driver releases the brake pedal 14, the return spring 15 urges the brake pedal 14 towards its non-braking default position (rest position).

Optionally, a first pressure relief path 34 (pressure release path 34) is formed from the first hydraulic circuit 30 to the reservoir 12 via the first master chamber 21 and the second cut-off valve 42 in the normal operating mode. The second cut-off valve 42 is arranged in the first pressure relief path 34 for blocking the pressure relief path 34 in the emergency mode and in a test mode (see below). A second pressure relief path 35 (pressure release path 35) is formed from the second hydraulic circuit 32 directly to the reservoir 12. The brake pedal sensor 17 senses that the brake pedal 14 returns to its default state and sends this information to the controller 11. Thereafter, the controller 11 controls and operates the cut-off solenoid valves 40, 40', 40''' in the first and second hydraulic circuits 30, 32 such that the hydraulic connection to the pressure supplier 16 is blocked and the brake fluid is directed from the first and second hydraulic circuits 30, 32 via the pressure relief paths 34, 35 to the reservoir 12. More specifically, the cut-off valves 40 between the hydraulic pressure supplier 16 and the wheel brakes 31, 33 are closed, while the cut-off valves 40', 40''', 42 between the wheel brakes 31, 33 and the reservoir 12 are opened. Thus, the brake fluid is directed from the hydraulic circuits 30, 32 and the hydraulic wheel brakes 31, 33 to the reservoir 12 via pressure relief paths 34, 35.

In the emergency operating mode (non-powered operating mode or when a failure is detected), the third cut-off valve 43 is in its opened position, whereas the second cut-off valve 42 is in its closed position. The cut-off valves 40, 40' and the check valves 45' of the first and second hydraulic circuits 30, 32 as well as the cut-off valves 40'' and the check valves 45 between the hydraulic circuits 30, 32 and the pressure supplier 16 are designed such that the hydraulic connection between the pressure supplier 16 and the hydraulic circuits 30, 32 is blocked in the emergency mode. The cut-off valves 40, 40' are normally open valves and are opened in the emergency mode. Moreover, the first master chamber 21 is hydraulically connected to the first hydraulic circuit 30 for pressurizing the first hydraulic circuit 30 in an emergency mode of the brake system 10. Furthermore, the second master chamber 22 is hydraulically connected to the second hydraulic circuit 32 for pressurizing the second hydraulic circuit 32 in the emergency mode. Thus, the emergency or "no power" state of the system 10 puts the tandem master cylinder 2 in hydraulic communication with the wheel brakes 31, 33 so that the driver's input to the brake pedal 14 directly causes braking.

When a user presses the brake pedal 14, the input rod 13 pushes the first master piston 23 further into the master cylinder housing 20. The second master piston 24 is urged into the second master chamber 22 and compresses spring 29. The pressure of the brake fluid inside the first master chamber 21 and the second master chamber 22 is increased. This causes the first and second hydraulic circuits 30, 32 to be pressurized to operate the hydraulic wheel brakes 31, 33. After the braking action, the springs 15, 29 urge the first and second master pistons 23, 24, the input rod 13 and the brake pedal 14 back to their initial positions (rest positions).

Preferably, the first pressure relief path 34 between the first hydraulic circuit 30 and the first master chamber 21 includes the same hydraulic fluid line 34 as the hydraulic connection between the first hydraulic circuit 30 and the first master chamber 21 for pressurizing the first hydraulic circuit 30 in the emergency mode.

In the rest position of the pistons 23, 24, the chambers 21, 22 can be filled with brake fluid through fluid supply lines 36, 37 in the emergency mode.

The controller 11 may be configured for closing the second cut-off valve 42 and opening the third cut-off valve 43 in order to switch the brake system 10 in the emergency operating mode when a failure is detected (e.g. in case of a malfunction of the hydraulic fluid supplier 16).

When braking in the emergency mode, due to the elastic pedal feel element 50 pushing against the second master piston 24 the pressure inside the second master chamber 22 can become higher than the pressure inside the first master chamber 21. Thus, under these circumstances the hydraulic circuits 30, 32 are operated by different pressures. However, in many applications it is preferred to operate the hydraulic circuits 30, 32 by using the same hydraulic pressure in the emergency mode. In order to balance/equalize the different pressures in the hydraulic circuits 30, 32, the master cylinder arrangement 1 and the brake system 10 shown in FIGS. 1 and 2 include balancing piston 7 which is described in more detail below.

The second master piston 24 encloses a balancing chamber 5. The balancing chamber 5 may be formed by a recess in the second master piston 24, e.g. by machining during post-processing the second master piston 24 or by casting simultaneously with the second master piston 24. The balancing piston 7 is movably arranged in the balancing chamber 5 of the second master piston 24. Furthermore, the balancing chamber 6 is hydraulically connected via a balancing path 3 to the first master chamber 21. A sealing member 9 may be provided between an outer surface of the balancing piston 7 and an inner surface of the second master piston 24 to provide a sealing between the second master chamber 22 and the balancing chamber 6. The sealing member 9 can have an annular shape and may surround the balancing piston 7. The sealing member 9 may be arranged in a groove formed in the balancing piston or the second master piston 24. Further, an optional axial stop 5 may be provided to delimit axial movement of the balancing piston 7 towards the second master chamber 22.

The balancing piston 7 is arranged so as to separate the second master chamber 22 from the balancing chamber 6 within the second master piston 24. A return spring 8 is arranged in the balancing chamber 6 biasing the balancing piston 7 towards a rest position. In FIG. 2, the balancing piston 7 is shown in its rest position. The balancing piston 7 is provided to equalize a first hydraulic pressure in the first master chamber 21 and a second hydraulic pressure in the second master chamber 22 when the second master piston 24 is unlocked in an emergency operating mode.

In the normal operating mode, the balancing piston 7 is in its rest position. In the emergency mode, the second master piston 24 is unlocked as described above. When the brake pedal 14 is operated, the elastic pedal feel element 50 presses against the second master piston 24, so that the second master piston 24 is moved out of its rest position (locking position). Consequently, the hydraulic pressure inside the second master chamber 22 is higher than the hydraulic pressure inside the first master chamber 21. As a result, the balancing piston 7 is moved out of its rest position towards the first master chamber 21 thereby decreasing the volume of the balancing chamber 6. This again results in pressure equalization between the first and second master chambers 21, 22. Thus, the first and second hydraulic circuits 30, 32 may be operated by pressures that are substantially equal. After the brake action, the brake pedal 14 and the input rod 13 return to their rest positions by means of the return spring 15. The pressurized brake fluid is directed from the hydraulic circuits 30, 32 to the reservoir 12 via the pressure relief paths. The pressure inside the first and second master chambers 21, 22 is relieved. Meanwhile, the return spring 8 biases the balancing piston 7 back to its rest position, thereby increasing the volume of the balancing chamber 6, which has its maximal volume in the rest position of the balancing piston 7. Springs 8, 15 and 29 can be made of a metal such as steel or stainless steel.

The reservoir 12 may be hydraulically connected to the first master chamber 21 and/or the second master chamber 22 by fluid lines 36, 37 (brake fluid supply paths 36, 37), respectively, for filling the respective chambers 21, 22 with brake fluid after a braking action. By this arrangement the first master chamber 21 and/or the second master chamber 22 can be filled with brake fluid when the first master piston 23 and/or the second master piston 24 are in their rest positions.

The fluid lines 36, 37 are connected to a first inlet 27 in a wall of the master cylinder housing 20 and a second inlet 28 in the wall of the master cylinder housing 20. The inlet 27, 28 are open when the second master piston 24 is in a rest position and closed when the second master piston 24 is moved out of the rest position, i.e. during a braking action. The first inlet 27 may be axially located between two adjacent seals 61, 62 (see FIG. 2). Furthermore, the second inlet 28 is axially arranged between two adjacent seals 63, 64. Thus, the first and second inlets 27, 28 for brake fluid supply are hydraulically connected to the reservoir 12.

A first ventilation channel 25 is provided in a piston wall 26 of the second master piston 24. The first ventilation channel 25 hydraulically connects the balancing chamber 6 to the first inlet 27 for brake fluid supply in a rest position of the second master piston 24 so that the first master chamber 21 is hydraulically connected to the first inlet 27 via the balancing path 3 and the first ventilation channel 25. Thus, using this configuration the first master chamber 21 may be ventilated/filled with hydraulic brake fluid from the reservoir 12 when the pressure of the brake fluid inside the first master chamber 21 is smaller than the pressure of the brake fluid inside the reservoir 12. Thus, the first inlet 27 may be only then in fluid communication with the first ventilation channel 25, when the second master piston 24 is in its rest position. By virtue of the configuration shown, no extra inlet(s) and no extra channel(s) are required in the first master piston 23 for ventilating the first master chamber 21. The first ventilation channel 25 may also allow ventilating/filling the balancing chamber 6 with brake fluid.

Moreover, a second ventilation channel 19 may be envisaged for filling the second master chamber 22. The second ventilation channel 19 is provided in the piston wall 26 of the second master piston 24. The second ventilation channel 19 hydraulically connects the second master chamber 22 to the second inlet 28 in the master cylinder housing 20 for brake fluid supply in the rest position of the second master piston 24. Thus, the second inlet 28 may be only then in fluid communication with the second ventilation 19 channel, when the second master piston 24 is in its rest position.

In some instances, a first seal 61, a second seal 62, a third seal 63 and a fourth seal 64 are arranged between the piston wall 26 and the wall of the master cylinder housing 20. The first seal 61, second seal 62, third seal 63 and/or fourth seal 64 may be annularly shaped seals. Furthermore, the seals 61, 62, 63, 64 may surround the second master piston 24. Typically, the first and second seals 61, 62 are neighbours, the second and third seals 62, 63 are neighbours, and the third and fourth seals 64 are neighbours. According to certain embodiments, the first inlet 27 is arranged between the first seal 61 and the second seal 62. The second inlet 28 is arranged between the third seal 63 and the fourth seal 64. Furthermore, a hole 18 is arranged in the wall of the master cylinder housing 20 and between the second seal 62 and the third seal 63. The balancing path 3 passes through the hole 18.

In the embodiment shown in FIG. 2, the balancing path 3 comprises a part of the first ventilation channel 25. In this case, the first ventilation channel 25 opens into the balancing chamber 6. The first ventilation channel 25 may be arranged such to span a sealing lip of the second seal 62 in the rest position of the second master piston. That is, a relatively large bore may be provided in the piston wall 26 of the second master piston 24, wherein the bore functions both as the first ventilation channel 25 and as part of the balancing path 3.

In an alternative embodiment, an additional balancing channel (not shown) is provided in the piston wall 26 of the second master piston. In this case, the balancing path 3 comprises the balancing channel in the second master piston 24. The balancing channel opens into the balancing chamber 6. The additional balancing channel may be axially off-set from the first ventilation channel 25. The balancing channel and the first ventilation channel 25 may be arranged to span a sealing lip of the second seal 62 in the rest position of the second master piston 24.

Further, a first cut-off valve 41 is arranged in the balancing path 3. The first cut-off valve 41 is a normally open valve. The first cut-off valve 41 may be a solenoid valve that can be electrically actuated and controlled by the controller 11. Moreover, the first cut-off valve 41 may be a 2/2 way valve having two connections and two valve positions. The first cut-off valve 41 can be opened in the emergency mode, while the first cut-off valve 41 blocks the balancing path 3 in the test mode of the master cylinder arrangement 1. In the normal operating mode, the first cut-off valve 41 can be closed or opened.

Furthermore, a check valve 44 may be envisaged in the hydraulic connection between the reservoir 12 and the first master chamber 21. The check valve 44 may be arranged parallel to the second cut-off valve 42. The check valve 44 allows filling the first master chamber 21 with brake fluid via the opening 58 when the pressure inside the first master chamber 21 is less than a pressure inside the reservoir 12. This is usually the case directly after a braking action.

A further hydraulic connection 56 between the first master chamber 21 and the reservoir 12 may be envisaged for moistening sealing members 57 with brake fluid. This may prolong the lifespan of the sealing members 57. The sealing members 57 are disposed between the first master piston 23 and the master cylinder housing 20 and provide a fluid tight seal therebetween.

In the following, the test mode/self-test of the master cylinder arrangement 1 is described. The self-test is preferably carried out when the master cylinder arrangement 1 and/or the brake system 10 are in the normal operating mode. That is, the second master piston 24 is typically locked during the test mode. Furthermore, the self-test may be performed when the vehicle is in a standstill position, e.g. just before or right after driving. The self-test may be also performed during maintenance of the vehicle, e.g. when the vehicle is in a workshop.

The controller 11 may be configured for performing a self-test of the brake system 10 by closing the first cut-off valve 41, the second cut-off valve 42 and the third cut-off valve 43 and by controlling the hydraulic pressure supplier 16 (i.e. the actuator) to pressurize the first master chamber 21. In particular, the controller 11 controls the hydraulic pressure supplier 16 and the first hydraulic circuit 30 such that the first master chamber 21 is pressurized via a test pressure path 60 between the first master chamber 21 and the first hydraulic circuit 30. The test pressure path 60 may include a part of the first pressure relief path 34, namely the fluid lines between the first hydraulic circuit 30 and the first master chamber 21. As a consequence, the pressure inside the first master chamber 21 may now equal the pressure that is provided by the hydraulic pressure supplier 16.

The first cut-off valve 41 thus allows the first master chamber 21 to be pressurized in the test mode for testing fluid tightness of the first master chamber 21. In particular, fluid tightness of the seals 57, 61 sealing the first master chamber 21 from its surroundings can be tested.

The controller 11 may receive signals from a pressure sensor disposed inside the first master chamber 21 to monitor the pressure inside the first master chamber 21 during the self test. If the pressure inside the first master chamber 21 drops during the self-test, this is indicative of an untight seal or untight seals 57, 61. Based on the measurement results of the pressure sensor 47, the controller 11 is configured to determine whether or not the first master chamber 21 is fluid tight.

After the self-test, the controller 11 may open the first cut-off valve 41 and the second cut-off valve 42 to release the pressure in the first master chamber 21. In this way, the pressurized hydraulic fluid is directed from the first master chamber 21 via the balancing path 3 and the first ventilation channel 25 as well as via the first pressure relief path 34 to the reservoir 12.

It should be mentioned that the solenoid valves 40, 40', 40", 40"', 41, 42, 43 depicted in FIGS. 1 and 2 are shown in their default, non-powered states.

The wheel brakes 33 may comprise rear-left and front-right brakes, whereas the wheel brakes 31 may comprise rear-right and front-left brakes. Alternatively, the wheel brakes 33 may comprise rear-left and rear-right brakes, while the wheel brakes 31 may comprise front-left and front-right brakes.

Any features shown in the FIGS. 1-2 may be combined with each other or may be separately claimed.

The invention claimed is:

1. A master cylinder arrangement for a brake system, comprising a tandem master cylinder including a master cylinder housing, a first master piston movably arranged in the master cylinder housing, a second master piston movably arranged in the master cylinder housing, a balancing piston movably arranged in the second master piston, and an elastic pedal feel element, wherein the master cylinder housing encloses a first master chamber and a second master chamber, the first master piston being directly displaceable by operating a brake pedal and the second master piston being a floating piston and separating the first master chamber, which is between the first master piston and the second master piston, from the second master chamber, the elastic pedal feel element being arranged in the first master chamber to be in contact with the first master piston and the second master piston for generating a pedal force when the brake pedal is operated while the second master piston is locked in a normal operating mode, wherein the second master piston encloses a balancing chamber, the balancing piston separating the balancing chamber from the second master chamber and the balancing chamber being hydraulically connected to the first master chamber via a balancing path for balancing a first hydraulic pressure in the first master chamber and a second hydraulic pressure in the second master chamber when the second master piston is unlocked in an emergency operating mode, wherein a first ventilation channel is provided in a piston wall of the second master piston, the first ventilation channel hydraulically connecting the balancing chamber to a first inlet for brake fluid supply in a rest position of the second master piston so that the first master chamber is hydraulically connected to the first inlet via the balancing path and the first ventilation channel, wherein a first cut-off valve is arranged in the balancing path for blocking the balancing path in a test mode of the master cylinder arrangement.

2. The master cylinder arrangement of claim 1, wherein a second ventilation channel is provided in the piston wall of the second master piston, the second ventilation channel hydraulically connecting the second master chamber to a second inlet for brake fluid supply in the rest position of the second master piston.

3. The master cylinder arrangement of claim 2, wherein a first seal, a second seal, a third seal and a fourth seal are arranged between the piston wall of the second master piston and a wall of the master cylinder housing, wherein the first inlet is arranged between the first seal and the second seal, wherein the second inlet is arranged between the third seal and the fourth seal and wherein the balancing path passes through a hole in the wall of the master cylinder housing which is arranged between the second seal and the third seal.

4. The master cylinder arrangement of claim 1, wherein the balancing path comprises a part of the first ventilation channel or an extra balancing channel provided in the piston wall of the second master piston.

5. The master cylinder arrangement of claim 4, wherein the first ventilation channel and/or the balancing channel is arranged to span a sealing lip of the second seal in the rest position.

6. The master cylinder arrangement of claim 1, wherein the first cut-off valve is a normally open valve.

7. The master cylinder arrangement of claim 1, wherein the pedal feel element is made of an elastomer.

8. The master cylinder arrangement of claim 1, wherein a spring is arranged in the balancing chamber biasing the balancing piston towards a rest position in which the balancing chamber assumes a maximum volume.

9. The master cylinder arrangement of claim 1, wherein a spring is arranged in the second master chamber biasing the second master piston towards the first master piston and towards its rest position.

10. A hydraulic system for a brake system, comprising the master cylinder arrangement of claim 1 and a reservoir for storing the brake fluid, wherein the inlet or each of the inlets for brake fluid supply is hydraulically connected to the reservoir and wherein the first master chamber is furthermore hydraulically connected to the reservoir via a pressure release path, a second cut-off valve being arranged in the pressure release path for blocking the pressure release path in the emergency operating mode and in the test mode.

11. The hydraulic system of claim 10, wherein the second cut-off valve is a normally closed valve.

12. A brake system, comprising
the hydraulic system of claim 10;
a brake pedal for displacing the first master piston;
a first hydraulic circuit including at least one first hydraulic wheel brake;
a second hydraulic circuit including at least one second hydraulic wheel brake; and
a hydraulic pressure supplier including an actuator for pressurizing the first hydraulic circuit and the second hydraulic circuit depending on an operation of the brake pedal in the normal operating mode,
wherein the first master chamber is hydraulically connected to the first hydraulic circuit for pressurizing the first hydraulic circuit in the emergency operating mode and wherein the second master chamber is hydraulically connected to the second hydraulic circuit via a third cut-off valve for pressurizing the second hydraulic circuit in the emergency operating mode when the third cut-off valve is open, while the second master piston can be locked by closing the third cut-off valve in the normal operating mode.

13. The brake system of claim 12, further comprising a brake pedal sensor for detecting an operation of the brake pedal and a control unit for activating the hydraulic pressure supplier and/or controlling control valves comprised by the first and the second hydraulic circuits depending on sensor signals of the brake pedal sensor, wherein the control unit is configured for keeping the second cut-off valve open and the third cut-off valve closed in the normal operating mode and/or for closing the second cut-off valve and opening the third cut-off valve in order to switch the brake system in the emergency operating mode when a failure is detected.

14. The brake system of claim 13, wherein the control unit is configured for performing a self-test of the brake system by closing the first cut-off valve and the second cut-off valve and by controlling the actuator to pressurize the first master chamber.

* * * * *